United States Patent [19]
Allen et al.

[11] Patent Number: 5,720,566
[45] Date of Patent: Feb. 24, 1998

[54] PRESSURE RELIEVED LUBRICATED JOINT

[75] Inventors: Joseph E. Allen, Brimfield; Dean M. Peterson, Roanoke, both of Ill.

[73] Assignee: Caterpillar Inc., Peoria, Ill.

[21] Appl. No.: 641,382

[22] Filed: Apr. 30, 1996

[51] Int. Cl.[6] .................................. F16C 11/00
[52] U.S. Cl. ..................... 403/38; 403/31; 403/162; 384/473
[58] Field of Search ....................... 403/31, 37, 38, 403/39, 157, 158, 161, 162, 150; 384/322, 473, 475; 277/3

[56] References Cited

U.S. PATENT DOCUMENTS

| | | | |
|---|---|---|---|
| 2,249,501 | 7/1941 | Teker | 308/187 |
| 2,351,909 | 6/1944 | Beretish et al. | 308/109 |
| 2,514,799 | 7/1950 | Rubertino et al. | 308/93 |
| 3,300,225 | 1/1967 | Shepler | 227/165 |
| 3,330,568 | 7/1967 | Wetzel | 227/198 |
| 3,467,448 | 9/1969 | Galle | 308/8.2 |
| 3,542,442 | 11/1970 | Kent | 384/473 |
| 3,920,250 | 11/1975 | Eklund | 277/51 |
| 4,066,269 | 1/1978 | Linne | 277/228 |
| 4,151,999 | 5/1979 | Ringel et al. | 277/165 |
| 4,244,588 | 1/1981 | Langewisch | 277/5 |
| 4,251,182 | 2/1981 | Schroeder | 403/158 X |
| 4,253,674 | 3/1981 | Fee | 277/5 |
| 4,269,802 | 5/1981 | Linne | 264/255 |
| 4,428,589 | 1/1984 | Reinsma | 277/101 |
| 4,469,336 | 9/1984 | Linne | 277/92 |
| 4,618,153 | 10/1986 | Nilsson | 277/152 |
| 4,815,191 | 3/1989 | Garman et al. | 403/162 X |
| 5,052,881 | 10/1991 | Keffeler et al. | 414/634 |
| 5,211,261 | 5/1993 | Garberg | 403/38 X |
| 5,211,484 | 5/1993 | Quaglia | 384/322 |
| 5,269,537 | 12/1993 | Kiesel | 277/164 |
| 5,380,016 | 1/1995 | Reinsma et al. | 277/152 |

FOREIGN PATENT DOCUMENTS

| | | | |
|---|---|---|---|
| 6235425 | 8/1994 | Japan | 384/473 |
| 874034 | 8/1961 | United Kingdom | 384/473 |

*Primary Examiner*—Harry C. Kim
*Attorney, Agent, or Firm*—Diana L. Charlton

[57] ABSTRACT

The present invention includes a method of relieving pressure within a sealed pin joint assembly so that the seal is protected from excessive pressure. The pin joint assembly includes slidably connecting a pin through a bearing assembly fitted within a bore in an equalizer bar. The pin is circumferentially surrounded by a pair of seals disposed on either side of the bearing assembly for sealing within the equalizer bar. The seals are positioned adjacent the bearing assembly to define a pair of cavities therebetween. A receiving passage extends from a counterbore at an outer surface of the equalizer bar and terminates at the bearing assembly and is fluidly connected with the pin joint assembly. A grease zerk is disclosed within the receiving passage to direct fluid into the joint wherein accumulation within the cavities is expected. As the pressure increases within the cavities either during addition of the lubricating fluid or during operation, a relief valve disposed within a pair of discharge passages in close proximity to the seals opens to relieve the pressure within the cavities. The relief in pressure within the cavities protects the seals from damage or destruction.

10 Claims, 2 Drawing Sheets

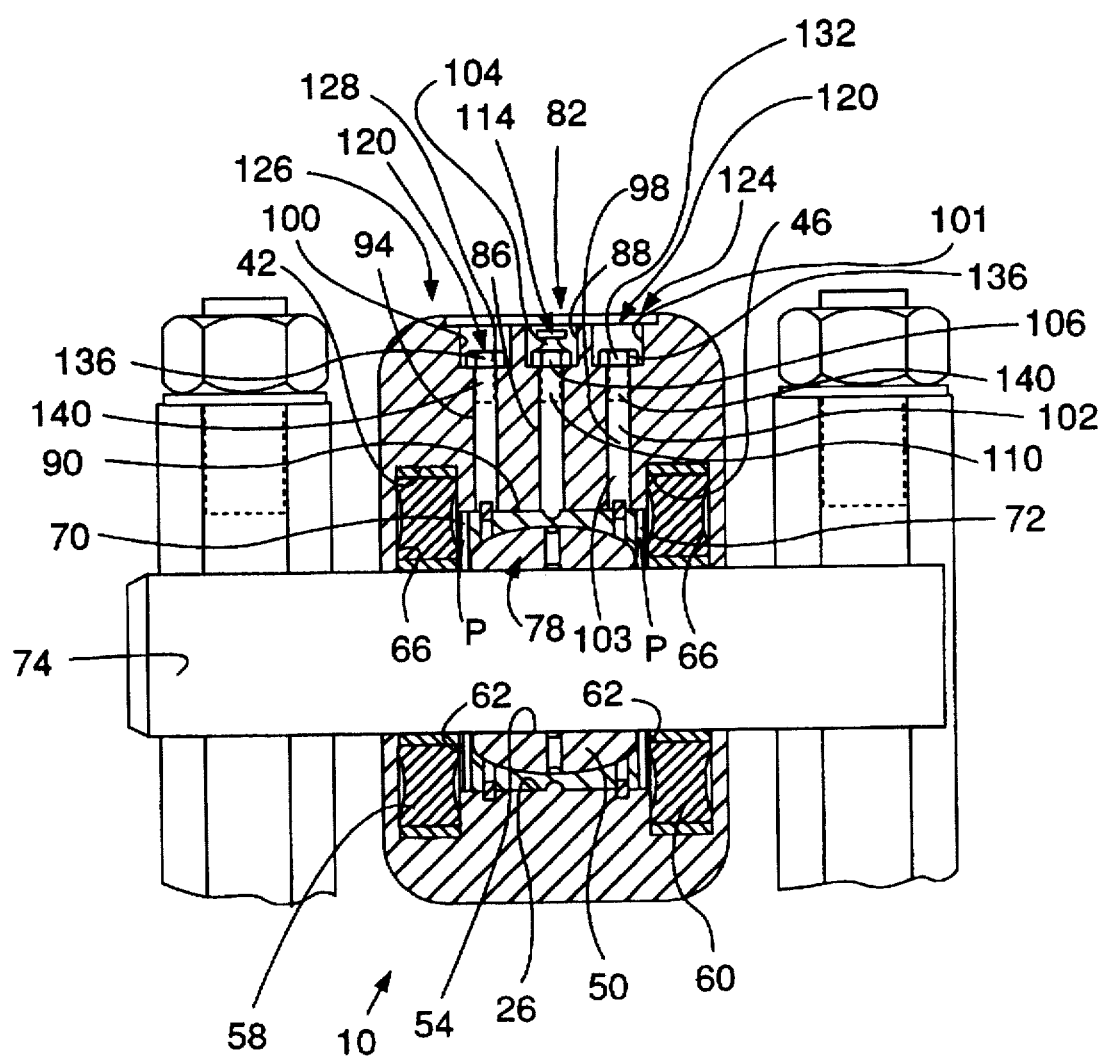
Fig-3-

5,720,566

1

PRESSURE RELIEVED LUBRICATED JOINT

TECHNICAL FIELD

This invention relates generally to lubricated joints and more particularly to the ability to relieve the pressure around a seal in the joint when the pressure exceeds a specific value.

BACKGROUND ART

Lubricated joints generally include the use of a sealing means between first and second members. The addition of lubricant to the joint to reduce wear between the first and second members generally increases the pressure around the sealing means. The increase in pressure around the sealing means may cause damage to the sealing means or total destruction of its sealing ability. It is well known to allow the excessive pressure around the sealing means to leak around the sealing means so as to avoid these problems. Unfortunately, the use of the sealing means as a method of relieving pressure within the joint allows for a breakdown of the effectiveness of the sealing means.

The present invention is directed to overcoming the problems as set forth above.

DISCLOSURE OF THE INVENTION

In one aspect of the present invention, a joint assembly comprises a first member which has an end portion with a bore defined therethrough. An inner fluid communication means extends from an outer surface of the first member a predetermined distance and terminates within the bore. The fluid communication means includes a receiving passage and a discharging passage fluidly connected to the receiving passage at one end and open to the atmosphere at an opposite end. A second member is movably connected to the first member and is slidably disposed within the bore to define a joint. A sealing means is disposed within an annulus in the bore and circumferentially surrounds the second member. The sealing means has an inner surface and an outer surface. A bearing assembly is disposed in the bore and circumferentially surrounds the second member. The bearing assembly is located adjacent the inner surface of the sealing means to define a cavity therebetween. The cavity is is fluidly connected to the fluid communication means. A means is provided for directing a fluid within the receiving passage and into the joint for substantial accumulation within the cavity. The accumulation within the cavity establishes a variable pressure therein. A means is disposed within the open end of the discharging passage for limiting communication with the atmosphere and for controlling the pressure of the fluid within the cavity so that the fluid pressure is maintained within a pre-established pressure range.

In another aspect of the present invention, a pin joint assembly for use on an equalizer bar of a construction machine comprises the equalizer bar having an end portion with a bore defined therethrough. An inner fluid communication means extends from an outer surface of the equalizer bar a predetermined distance and terminates within the bore. The fluid communication means includes a receiving passage and pair of discharging passages fluidly connected to the receiving passage at one end and open to the atmosphere at an opposite end. A pin is movably connected to the equalizer bar and is slidably disposed within the bore to define a pin joint. A pair of sealing means is provided in the pin joint. Each of the sealing means are disposed within an annulus in the bore and circumferentially surround the pin. Each of the pair of sealing means has an inner surface and

2 an outer surface. A bearing assembly is disposed in the bore between the pair of sealing means and circumferentially surrounds the pin. The bearing assembly is located adjacent the inner surfaces of the sealing means at its ends to define a pair of cavities therebetween which are fluidly connected to the fluid communication means. One of the pair of cavities is operatively associated with one of the pair of discharge passages and the other of the pair of cavities is operatively associated with the other of the pair of discharge passages. A means is provided for directing a fluid within the receiving passage and into the joint for substantial accumulation within the pair of cavities. The accumulation within the cavities establishes a variable pressure therein. A means is disposed within the open end of the discharging passages for limiting communication with the atmosphere and for controlling the pressure of the fluid within the respective cavities so that the fluid pressure is maintained within a pre-established pressure range.

In yet another aspect of the present invention, a method for relieving pressure within a sealed joint comprises the steps of assembling a first member to a second member and providing a sealing means therebetween. Then, defining a cavity within the sealed joint between the first and the second member in close proximity to the sealing means. Next, lubricating the sealed joint with a fluid through a first passage for substantial accumulation in the cavity with the accumulation of fluid in the cavity. The accumulation within the cavity establishes a variable pressure therein. Finally, selectively controlling the pressure of the fluid within the cavity by a pressure relieving means disposed in a second passage which is separate from and fluidly connected to the first passage.

The present invention includes a means to control the pressure within a sealed joint so that the sealing means therearound is not damaged by excessive pressure in the joint.

BRIEF DESCRIPTION OF THE DRAWINGS

FIG. 3 is an enlarged detail view taken along line 3—3 in FIG. 1.

BEST MODE FOR CARRYING OUT THE INVENTION

Figure 1:
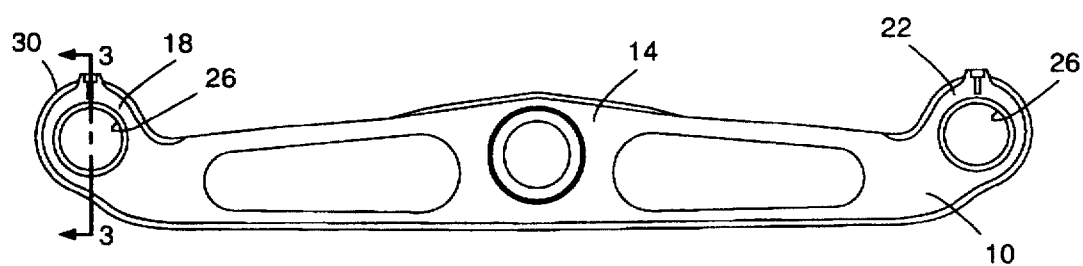
FIG. 1 is a diagrammatic front view of a equalizer bar shoving a view of the present invention.
Figure 2:
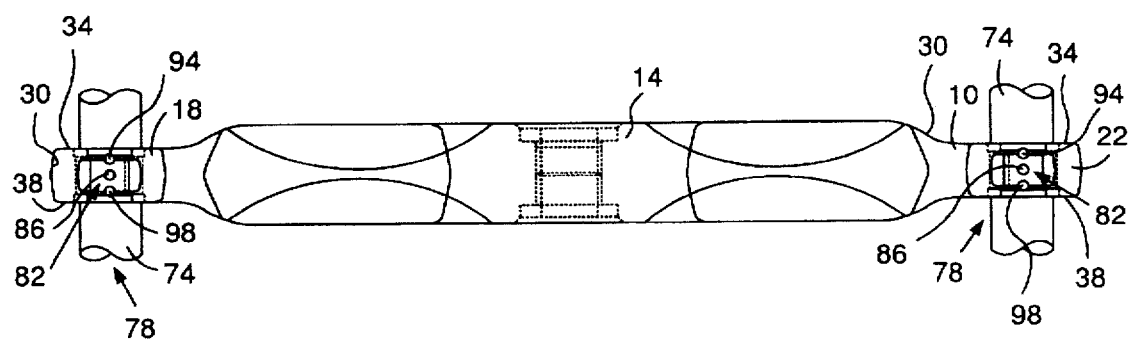
FIG. 2 is a diagrammatic top view of the equalizer bar in FIG. 1.

An equalizer bar 10 for a construction machine (not shown) is shown in FIGS. 1–3. The equalizer bar 10 has a center portion 14 and a pair of end portions 18,22. For purposes of clarity, only one end portion 18 will be described in detail. It should be understood, however, that the other end portion 22 has similar features which function in a similar manner as that disclosed on end portion 18. End portion 18 has a bore 26 which extends therethrough and an outer surface 30 therearound and a pair of spaced side walls 34,38 opposite one another. The bore 26 has a pair of annuli 42,46, which can be seen more clearly in FIG. 3. The annuli 42,46 are located within the bore 26 in close proximity to the side walls 34,38, respectively. A spherical bearing assembly 50 is press fitted within the bore 26 to substantially cover the surface of the bore 26. The bearing assembly 50 has a bore 54 therethrough. A pair of seals 58,60 of any suitable type, such as a radial lip seal, are positioned within the bore 26. One of the pair of seals 58 is disposed in the annulus 42 and the other of the pair of seals is disposed in the annulus 46.

The seals 58,60 are located on opposite sides of the bearing assembly 50 and each seal 58,60 has an inner surface 62 facing the bearing assembly 50 and an outer surface 66 facing away from the bearing assembly 50. The inner surface 62 of the seals 58 lie adjacent the opposite ends of the bearing assembly 50 to define a pair of cavities 70,72 therebetween.

A pin 74 is slidably disposed within the bore 54 of the bearing assembly 50 for movable connection to the equalizer bar 10 to define a pin joint assembly 78. The seals 58,60 circumferentially surround the pin 74 for sealing within the bore 26. It should be recognized that the pin 38 might be slidably disposed in the bore 26 of the equalizer bar 10 in a manner which provides a suitable fit without the use of a bearing assembly 50.

An inner fluid communication means 82, which can be seen more clearly in FIG. 3. is located within the end portion 18 and extends from the outer surface 30 and terminates within the bore 26 at the bearing assembly 50. The inner fluid communication means 82 includes a receiving passage 86 which extends from a counterbore 88 at the outer surface 30 and terminates at a central portion 90 of the bearing assembly 50 for fluid communication therewith. The counterbore 88 has a larger diameter than the receiving passage 86. The inner fluid communication means 82 also includes a pair of discharge passages 94,98 positioned on opposite sides of the receiving passage 86 between the respective seals 42,46. The discharge passages 94,98 extend from counterbores 100, 101, respectively, at the outer surface 30 and terminate at the opposite ends of the bearing assembly 50 for fluid communication with the receiving passage 86 and the respective cavities 70,72. One end 102 of the discharge passages 94,98 is open to the atmosphere and the other end 103 is open toward the respected cavities 70,72. The discharge passages 94,98 are substantially positioned adjacent the respective seals 42,46 and are preferably at a close distance to the seals 42,46.

A grease zerk 104 with a head 106 and a tapered threaded body 110 is partially disposed within the receiving passage 86 through the counterbore 88. The body 110 of the grease zerk 104 is threaded into the receiving passage 86 until it reaches a tightened state to control communication between the atmosphere and the receiving passage 86. The grease zerk 104 provides a means 114 for allowing a lubricating fluid of any suitable type, such as lubricating grease or oil, to be directed into the pin joint assembly 78 through the receiving passage 86 in a well-known manner, such as by a grease pump. It should be understood, however, that any suitable method for allowing lubricating fluid into the receiving passage 86 could be used. During lubrication of the pin joint assembly 78, the addition of the lubricating fluid causes a significant pressure change within the pin joint assembly 78 and the lubricating fluid is thereafter substantially accumulated in the cavities 70,72 establishing a variable pressure P therein.

A means 120 for limiting communication between the atmosphere and the discharging passages 94,98 is partially disposed Within the discharging passages 94,98 through the counterbore 100,101, respectively. The limiting means 120 is used as a method 124 for relieving the pressure P within the pin joint assembly 78 that is caused during the addition of the lubricating fluid as well as volume changes of the accumulated lubricating fluid in the cavities 70,72. The limiting means 120 includes a pressure relieving means 126 such as a pair of pressure relief valves 128,132. Each of the pressure relief valves 128,132 has a head 136 and a tapered threaded body 140. The pressure relief valves 128,132 control the pressure P within a specific range within the respective cavities 70,72, preferably between 15–100 PSI. It should be understood, however, that the pressure setting of the pressure relief valves is dependent on the types of seals used in the system and their respective pressure tolerances. The body 140 of the relief valves 128,132 is threaded into the respective discharging passage 94,98 until the tapered threads become tightened.

INDUSTRIAL APPLICABILITY

In order to reduce wear in the pin joint assembly 78, lubricating fluid is forced into the receiving passage 86 through the grease zerk 104. The lubricating fluid passes through the bearing assembly 50 and substantially accumulates in the cavities 70,72 between the bearing assembly 50 and the seals 58,60. During the addition of the lubricating fluid, the pressure P within the pin joint assembly may change significantly. Afterward, when the lubricating fluid substantially accumulates in the cavities 70,72, the pressure P within the cavities 70,72 fluctuates due to trapped air or operational movements within the pin joint assembly 78 and varies according to the amount of lubricating fluid within the system. Therefore, pressure fluctuations occur both when the lubricating fluid is being added to the pin joint assembly 78 and during operation.

The relief valves 128,132 are pre-set to control the pressure within the cavities 70,72 within the pre-established pressure range. The relief valves 128,132 open when the pressure within the pin joint assembly 78 exceeds the pre-established pressure range, either during the addition of lubricating fluid or during operation. More specifically, the relief valves open when the pressure P within the cavities 70,72 exceeds the pre-established pressure range. The relief of the pressure P within the cavities 70,72 protects the seals 58,60 from bulging and subsequent damage. The relative position of the relief valves 128,132 in close proximity to the seals 58,60 provides an effective means to protect the seals 58,60 from excessive pressure. Additionally, the position of the relief valves 128,132 between the receiving passage 86 and the seals 58,50 is important to this effectiveness. It should be understood that the farther the relief valves 128,132 are located from the seals 58,60 the less effective the protection from excessive pressure. The decrease in effectiveness occurs due to the viscosity of the lubricating fluid and bearing assembly 50 restrictions over the greater distance. It should also be understood that the position of the relief valves 128,132 between the receiving passage 86 and the seals 58,60 ensures that the relief valves 128,132 are positioned in close proximity to the seals 58,60.

In view of the above, the use of a relief valve in a sealed joint assembly which is lubricated provides a low cost means to protect the seals from excessive pressure within the assembly.

We claim:

1. A joint assembly, comprising:

a first member having an end portion with a bore defined therethrough and an inner fluid communication means extending from an outer surface a predetermined distance and terminating within the bore, the fluid communication means including a receiving passage and a discharging passage adjacent the receiving passage fluidly connected to the receiving passage at one end and open to the atmosphere at an opposite end;

a second member movably connected to the first member and slidably disposed within the bore, the second member fitted against the first member to define a joint;

a sealing means disposed within an annulus in the bore and circumferentially surrounding the second member, the sealing means having an inner surface and an outer surface;

a cavity defined within the bore adjacent the sealing means which is fluidly connected to the fluid communication means;

means for directing a fluid within the receiving passage and into the joint for substantial accumulation within the cavity, the accumulation within the cavity establishing a variable pressure therein; and means disposed within the open end of the discharging passage for limiting communication with the atmosphere and for controlling the pressure of the fluid within the cavity so that the fluid pressure is maintained within a pre-established pressure range.

2. The joint assembly of claim 1, wherein the cavity is located adjacent the discharging passage and the receiving passage and the discharging passage are disposed a predetermined distance from the sealing means.

3. The joint assembly of claim 1, wherein the discharging passage is located between the sealing means and the receiving passage.

4. The joint assembly of claim 3, wherein the discharging passage is substantially adjacent the sealing means.

5. The joint assembly of claim 1, wherein the limiting and controlling means is a relief valve.

6. A pin joint assembly for use on a construction machine, comprising:

an equalizer bar having an end portion with a bore defined therethrough and an inner fluid communication means extending from an outer surface a predetermined distance and terminating within the bore, the fluid communication means including a receiving passage and a pair of discharging passages each fluidly connected to the receiving passage at one end and open to the atmosphere at an opposite end;

a pin movably connected to the equalizer bar and slidably disposed within the bore to define a pin joint;

a pair of sealing means each disposed within an annulus in the bore and circumferentially surrounding the pin, each of the pair of sealing means having an inner surface and an outer surface;

a bearing assembly disposed in the bore between the pair of sealing means and circumferentially surrounding the pin, the bearing assembly located adjacent the inner surfaces of the sealing means at its ends to define a pair of cavities therebetween which are fluidly connected to the fluid communication means, one of the pair of cavities being operatively associated with one of the pair of discharging passages and the other of the pair of cavities being operatively associated with the other of the pair of discharging passages;

means for directing a fluid within the receiving passage and into the pin joint for substantial accumulation within the pair of cavities, the accumulation within the pair of cavities establishing a variable pressure therein; and means disposed within each of the open ends of the discharging passages for limiting communication with the atmosphere and for controlling the pressure of the fluid within the respective cavities so that the fluid pressure is maintained within a pre-established pressure range.

7. The pin joint assembly of claim 6, wherein the pair of cavities are located adjacent to the respective pair of discharging passages and the receiving passage and the discharging passages are disposed a predetermined distance from the sealing means.

8. The pin joint assembly of claim 6, wherein one of the pair of discharging passages is located between the one of the pair of sealing means and the receiving passage and the other of the pair of discharging passages is located between the other of the pair of sealing means and the receiving passage.

9. The pin joint assembly of claim 8, wherein the discharging passages are substantially adjacent the respective sealing means.

10. The pin joint assembly of claim 6, wherein the limiting and controlling means is a relief valve.

* * * * *